Aug. 1, 1939.   C. G. DEUBEL   2,167,880

METHOD OF MAKING DIES

Filed May 28, 1936

Inventor
Carl George Deubel
by Bruings and Cushless
His Attorneys.

Patented Aug. 1, 1939

2,167,880

UNITED STATES PATENT OFFICE 2,167,880

METHOD OF MAKING DIES

Carl George Deubel, Harrisburg, Pa., assignor to Progressive Service Company, Harrisburg, Pa., a corporation of Missouri Application May 28, 1936, Serial No. 82,270

2 Claims. (Cl. 76—107)

This invention relates generally to dies and particularly to double-edged cutting dies of the dinking type and the process of making the same.

Double edged cutting dies such as are used in leather working as, for instance, for cutting sole blanks from leather skins, have the advantage that the die for both the right and left element may be in the same piece of apparatus. For instance, right soles may be made with one side of the die and left soles with the other side of the die. It is likewise with other parts of leather articles, such, for instance, as the quarter and vamp sections used in shoes.

The object of the present invention, generally stated, is to provide a double edged cutting die of the type referred to wherein a strong and rugged construction is provided and the useful life of the die prolonged.

A further object of the invention is to provide a process of making dies of the type referred to whereby the dies may be produced economically and rapidly.

A more specific object of the present invention is to provide a process of welding preformed cutting elements to other parts in the manufacture of dies of the type referred to.

Other objects will become apparent to those skilled in the art when the following description is read in connection with the accompanying drawing, in which.

Figure 1:
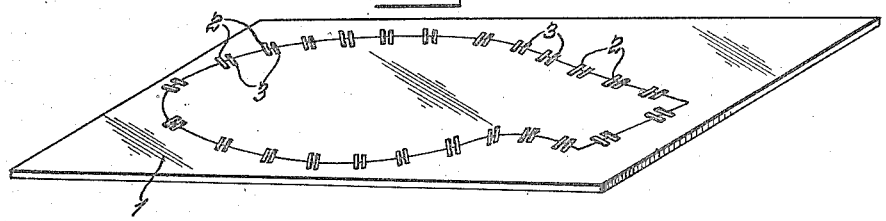
Figure 1 is a perspective view of a base plate blank suitable for use in the manufacture of dies according to the present invention.

In accordance with the present invention, generally stated, elongated cutting elements such as strips of triangularly shaped steel stock may be secured as by welding to opposite sides of a suitable base plate which may for instance, be of steel. After the cutting elements are secured to the base plate in a shape such as to form the desired contour of cutting edge, the excess base plate stock may be removed both outwardly and inwardly from the cutting elements so as to provide a completed die. The removal of the stock inwardly of the cutting elements may be to an extent sufficient to permit visibility of the material being operated upon, in order to facilitate location of the die but yet leave a sufficient quantity of the base plate intact to reinforce the structure.

The present invention further contemplates a method of treating the base plate in order to facilitate welding of the cutting element stock thereto. In accordance with one embodiment, a series of slight projections may be formed on the flat surface of the base plate in a line corresponding substantially to the contour of the cutting edge which is desired. The cutting element stock may then be applied to the base plate, shaped according to the line of the series of projections thereon and in superposed relation to the projections. The cutting element may then be securely welded to the base plate, as by spot welding in the region of the respective projections, without destroying the preformed cutting edge with which the cutting element stock may be provided.

Referring now to the drawing, a plate 1, which may be of steel and of a size sufficient to form the desired die, may be provided with a series of projections 2 constituting slight upsets in the flat surface of plate 1 and arranged in a line thereon corresponding generally to the contour of the cutting edge of the die which will be produced. Adjacent each of projections 2 may be a projection 3 extending in the opposite direction so as to present a slight upset on the opposite flat surface of plate 1.

Figure 2:
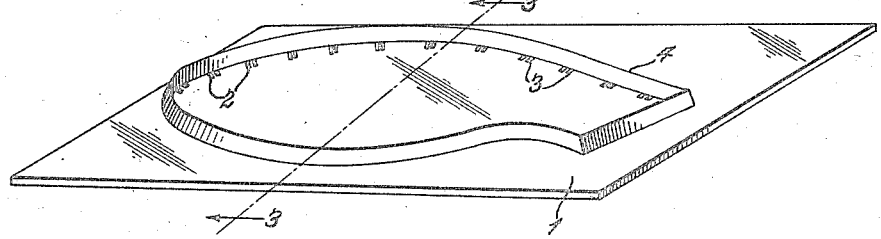
Figure 2 is a perspective view of the base plate shown in Figure 1 having cutting elements attached thereto.
Figure 3:
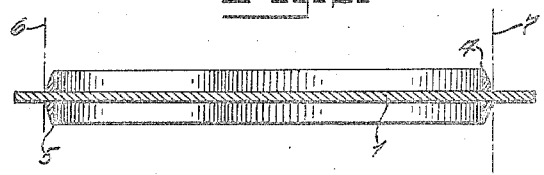
Figure 3 is a sectional view taken along line 3—3 of Figure 2.

In manufacturing dies according to the present invention cutting element stock of triangular section may be employed. For example, the cutting element stock may be of right triangular section as shown in Figure 3. An elongated strip 4 of such stock may be bent to approximate shape of the cutting edge desired as shown in Figure 2. The shaped cutting edge stock may then be placed upon the series of projections 2 and a similarly shaped but oppositely directed strip of cutting element stock 5 may be placed upon projections 3 on the opposite side of plate 1. The strips of cutting element stock 4 and 5 may then be secured to plate 1 by welding, such for instance, as spot welding in the region of projections 2 and 3 so as to provide an intermittent but practically continuous bond between the cutting elements 4 and 5 and base plate 1 interposed therebetween.

Figure 4:
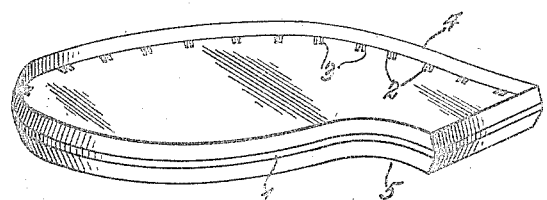
Figure 4 is a perspective view of die shown in Figures 2 and 3 after the excess base plate stock has been removed outwardly of the cutting elements.
Figure 6:
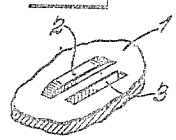
Figure 6 is a detail view showing in exaggerated proportions the upsets shown on the base plate blank in Figure 1.

The surplus base plate stock may then be removed from the assembly as, for instance, by cutting the stock outwardly from lines 6 and 7 as shown in Figure 3 away from the assembly in order to produce a roughly formed die shown in Figure 4.

Figure 5:
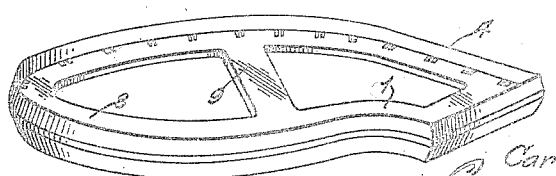
Figure 5 is a perspective view of the completed die.

If desired, part of the base plate 1, located inwardly of the cutting elements 4 and 5, may also be cut away as shown in Figure 5 in order to provide open spaces therein through which the user of the die may observe the material being operated upon. In cutting away the stock inwardly of the cutting elements 4 and 5, however, a sufficient amount may be left so as to form a continuous reinforcing part 8 extending along adjacent the cutting elements. In order to further reinforce the die, additional reinforcing strips such as 9 may be left.

With the roughly formed die in this condition, the edges may be ground and the die is ready for use.

From the foregoing description it will be apparent that the present invention accomplishes its objects and that a double-edge cutting die is produced in a convenient and economical manner and that a process is provided whereby elongated strips of preformed cutting element stock may be welded to a suitable base plate without substantially marring or fusing the preformed edge thereof.

While in the foregoing description a specific embodiment of the die made in accordance with the present invention has been given, it is to be understood that the shapes shown in the accompanying drawing and the specific details of construction hereinbefore described and shown in the accompanying drawing have been referred to merely for the purpose of disclosing an illustrative embodiment of the invention, and it is therefore to be understood that the invention is not limited to such detail features of construction and shape. It is apparent that many modifications of the die shown in the accompanying drawing and the process herein described will present themselves to those skilled in the art without departing from the spirit of this invention. It is distinctly understood, therefore, that such modifications and the use of such individual features and subcombinations of features as do not depart from the spirit of this invention are, although not specifically described herein, contemplated by and within the scope of the appended claims.

Having thus described the invention, the following claims are made:

1. In the art of making dies the process comprising, providing a flat base plate having an area greater than that of the die to be produced, upsetting a series of projections on one side of the base plate in a line corresponding substantially to the shape of the cutting edge desired, forming series of projections on the opposite side of said plate, the projections of the latter series being closely adjacent the corresponding projections of the former series, placing a pair of elongated cutting elements one on each side of said plate in superposed relation to the line of projections thereon, spotwelding said pair of cutting elements to the base plate, removing the excess base plate stock outwardly of the cutting elements, and removing a substantial part of the base plate stock inwardly of the cutting elements to form open space thereat with a continuous part extending along the cutting element.

2. In the art of making dies, the process comprising, providing a flat base plate having an area greater than that of the die to be produced, bending two strips of right triangular section cutting dies stock to form circuitous cutting edges with the hypotenuse on the exterior, one of said cutting edges being the mirror image of the other, upsetting a series of protuberances on opposite sides of said plate in a line conforming to the shape of the circuitous cutting edges, the respective protuberances of the series on one side of the plate being closely adjacent the corresponding protuberances of the series on the other side, mounting the bent strips upon opposite sides of said plate overlying said protuberances, spot welding the strips to the base plate at the protuberances, and removing the excess stock from the base plate.

CARL GEORGE DEUBEL.